United States Patent Office 3,095,354
Patented June 25, 1963

3,095,354
INHALATION ANESTHETIC: 2-BROMO-1,1,2-TRIFLUROETHYL METHYL ETHER
Eric R. Larsen, Midland, and Max R. Broadworth, Bay City, Mich., assignors to The Dow Chemical Company, Midland, Mich., a corporation of Delaware
No Drawing. Filed July 28, 1960, Ser. No. 45,810
8 Claims. (Cl. 167—52)

This invention relates to the halogenated ether compound, 2-bromo-1,1,2-trifluoroethyl methyl ether, and more particularly to the process for utilizing said ether compound as a general inhalation anesthetic.

2-bromo-1,1,2-trifluoroethyl methyl ether, having a boiling point of about 88.8° C. at 760 mm. pressure and a specific gravity of about 1.3687, is a known chemical composition and generally prepared by the reaction of 1-bromo-1,1,2-trifluoroethylene and methanol in the presence of alkali as described in the abstract of the doctorial thesis by Arieh Demiel, Hebrew University, Jerusalem (Journal of Organic Chemistry, volume 25, commencing at page 993).

Surprisingly and unexpectedly, we have discovered that 2-bromo-1,1,2-trifluoroethyl methyl ether is highly useful as a general inhalation anesthetic for warm-blooded, air-breathing animals, particularly those comprising the primate species.

Administration of said ether compound may be easily carried out by means of an inhalation mask and accompanying anesthesia apparatus; nevertheless, any means wherein vaporization and patient inhalation are achieved may be employed with satisfactory results obtained therefrom. Usually, vaporization is allowed to take place in air, oxygen and combinations thereof; however 2-bromo-1,1,2-trifluoroethyl methyl ether may be vaporized with equal facility in the presence of a gaseous vaporization medium such as nitrogen, helium, carbon dioxide and other innocuous gases presently employed in inhalation anesthesia.

In all cases, deep surgical anesthesia has been quite rapidly induced by the subject ether compound (within about one to about five minutes), without the presence of struggling, excitation, extensor rigidity, tremor, salivation, vomiting and other like actions often encountered during administration. Recovery is likewise quite rapidly achieved without nausea, dizziness or other discomforts usually associated with inhalation anesthesia.

In addition to the physiological benefits experienced, the present anesthetic compound possesses a low degree of combustibility and may be combined with oxygen, carbon dioxide, air and other similar carrying gases under normal operating conditions and temperatures without danger of fire and explosion, thereby obviating the requirement for safety apparatus heretofore considered an indispensable additament to anesthetic paraphernalia.

Illustrative of the results obtained from the utilization of 2-bromo-1,1,2-trifluoroethyl methyl ether as an inhalation anesthetic, about 1 to about 5 cubic centimeters of said ether were vaporized by surface contact with a gaseous oxygen stream and the resulting mixture administered to a normal, conscious, fasted, 6.1 kilogram male Rhesus monkey by means of an inhalation mask. Following about one minute of proximate administration, the monkey became sufficiently drowsy to enable secure affixation of the inhalation mask to the monkey's face; thereafter, two-minute inhalation achieved deep surgical anesthesia. An electrocardiogram revealed no abnormality. Blood pressure remained normal throughout administration as well as maintenance. Administration was discontinued and the anesthesized monkey was returned to a cage; within 30 minutes, the monkey was fully active, alert and evidencing no deleterious effects from the anesthesia. No unusual effects were noted during a thirty-day post-anesthesia observation.

Various modifications may be made in the present invention without departing from the spirit or scope thereof, and it is to be understood that we limit ourselves only as defined in the appended claims.

We claim:
1. The process which comprises administering 2-bromo-1,1,2-trifluoroethyl methyl ether as a general inhalation anesthetic.
2. The process which comprises administering 2-bromo-1,1,2-trifluoroethyl methyl ether to a warm-blooded, air-breathing animal as a general inhalation anesthetic.
3. The process which comprises administering 2-bromo-1,1,2-trifluoroethyl methyl ether to a primate species of a warm-blooded, air breathing animal as a general inhalation anesthetic.
4. The process which comprises administering 2-bromo-1,1,2-trifluoroethyl methyl ether to a monkey as a general inhalation anesthetic.
5. The process which comprises administering 2-bromo-1,1,2-trifluoroethyl methyl ether as a general inhalation anesthetic by vaporization of said ether in the presence of an innocuous gas vaporization medium.
6. The process which comprises administering 2-bromo-1,1,2-trifluoroethyl methyl ether to a warm-blooded, air-breathing animal as a general inhalation anesthetic by vaporization of said ether in the presence of an innocuous gas vaporization medium.
7. The process which comprises administering 2-bromo-1,1,2-trifluoroethyl methyl ether to a primate species of a warm-blooded, air-breathing animal as a general inhalation anesthetic by vaporization of said ether in the presence of an innocuous gas vaporization medium.
8. The process which comprises administering 2-bromo-1,1,2-trifluoroethyl methyl ether to a monkey as a general inhalation anesthetic by vaporization of said ether in the presence of an innocuous vaporization medium.

References Cited in the file of this patent

Robbins: J. Pharmacology and Experimental Therapeutics, vol. 86, pp. 197–204, 1946.
Poznak: Chem. Abst., vol. 54, p. 21508(b), 1960.
Demiel: J. Org. Chem., vol. 25, pages 993–6, June 1960.
Poznak: Fed. Proc., vol. 19, No. 1, 1960, page 273, sec. 117, abst. 3.